United States Patent [19]

Allen et al.

[11] Patent Number: 4,732,882
[45] Date of Patent: Mar. 22, 1988

[54] CATALYST COMPOSITION FOR POLYMERIZING ALPHA-OLEFINS

[75] Inventors: Luanne M. Allen, Port Arthur, Tex.; Robert O. Hagerty, Edison; Richard O. Mohring, Bridgewater, both of N.J.

[73] Assignee: Mobil Oil Corporation, New York, N.Y.

[21] Appl. No.: 822,359

[22] Filed: Jan. 24, 1986

[51] Int. Cl.$^4$ .................. C08F 4/62; C08F 4/64; C08F 4/68
[52] U.S. Cl. ................... 502/104; 502/103; 502/112; 502/115; 502/120; 502/126; 502/132
[58] Field of Search ............... 502/103, 104, 112, 115, 502/120, 126, 132

[56] References Cited

U.S. PATENT DOCUMENTS

| | | | |
|---|---|---|---|
| 2,905,645 | 9/1959 | Anderson et al. | 502/103 X |
| 2,912,419 | 11/1959 | Peters et al. | 502/103 X |
| 2,936,291 | 5/1960 | Peters et al. | 502/103 X |
| 3,052,660 | 9/1962 | Osgan | 502/103 X |
| 3,574,138 | 4/1971 | Ziegler et al. | 252/429 |
| 3,787,384 | 1/1974 | Stevens et al. | 260/94.9 |
| 4,148,754 | 4/1979 | Strobel et al. | 252/429 |
| 4,173,547 | 11/1979 | Graff | 252/429 |
| 4,302,566 | 11/1981 | Karol et al. | 526/125 |
| 4,387,200 | 6/1983 | Gessell et al. | 526/122 |
| 4,481,301 | 11/1984 | Nowlin et al. | 502/104 |

FOREIGN PATENT DOCUMENTS 120503 10/1984 European Pat. Off. .

*Primary Examiner*—Patrick P. Garvin, Sr.
*Attorney, Agent, or Firm*—Alexander J. McKillop; Michael G. Gilman; Stanislaus Aksman

[57] ABSTRACT

A catalyst composition for polymerizing alpha-olefins is prepared by reacting a transition metal compound, e.g., titanium, with trimethylaluminum catalyst activator. In a preferred embodiment, the catalyst is supported on a porous refractory support and is prepared by additionally reacting a magnesium compound or an organomagnesium composition with the support.

Also disclosed is a process for polymerizing alpha-olefins in the presence of the catalyst of the invention. The polymer products have higher bulk density and produce films of greater strength than polymers prepared with similar catalysts utilizing different alkyl-aluminum activators, e.g., triethylaluminum and triisobutylaluminum.

56 Claims, 1 Drawing Figure

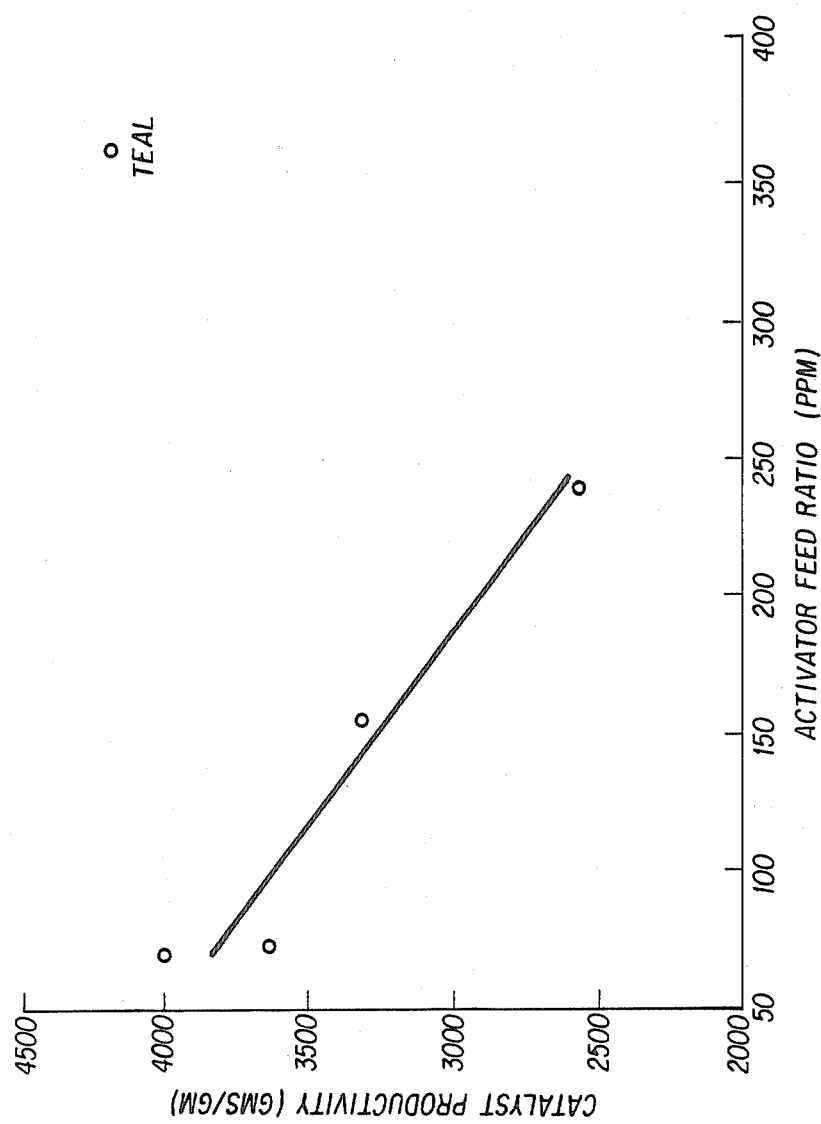

CATALYST COMPOSITION FOR POLYMERIZING ALPHA-OLEFINS

BACKGROUND OF THE INVENTION

1. Field of the Invention

The present invention relates to a catalyst for polymerizing alphaolefins, a method for producing such a catalyst and to a method of polymerizing alpha-olefins with such a catalyst. A particular aspect of the present invention relates to a method for preparing a high activity catalyst composition which produces medium density and linear low density polyethylene (LLDPE), having relatively narrow molecular weight distribution, and to the polymerization process utilizing such a catalyst composition.

2. Description of the Prior Art

Linear low density polyethylene polymers possess properties which distinguish them from other polyethylene polymers, such as ethylene homopolymers. Certain of these properties are described by Anderson et al, U.S. Pat. No. 4,076,698.

Karol et al, U.S. Pat. No. 4,302,566, describe a process for producing certain linear low density polyethylene polymers in a gas phase, fluid red reactor.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene, per se.

Graff, U.S. Pat. No. 4,173,547, describes a supported catalyst obtained by treating a support with both an organoaluminum compound and an organomagnesium compound followed by contacting this treated support with a tetravalent titanium compound.

Stevens et al, U.S. Pat. No. 3,787,384, and Stroebel et al, U.S. Pat. No. 4,148,754, describe a catalyst prepared by first reacting a support (e.g., silica containing reactive hydroxyl groups) with an organomagnesium compound (e.g., a Grignard reagent) and then combining this reacted support with a tetravalent titanium compound. According to the teachings of both of these patents, no unreacted organomagnesium compound is present when the reacted support is contacted with the tetravalent titanium compound.

Ziegler, deceased, et al, U.S. Pat. No. 4,063,009, describe a catalyst which is the reaction product of an organomagnesium compound (e.g., an alkylmagnesium halide) with a tetravalent titanium compound. The reaction of the organomagnesium compound with the tetravalent titanium compound takes place in the absence of a support material.

A vanadium-containing catalyst, used in conjunction with triisobutylaluminum as a co-catalyst, is disclosed by W. L. Carrick et al in *Journal of American Chemical Society*, Volume 82, page 1502 (1960) and Volume 83, page 2654 (1961).

Nowlin et al, U.S. Pat. No. 4,481,301, the entire contents of which are incorporated herein by reference, disclose a supported alpha-olefin polymerization catalyst composition prepared by reacting a support containing OH groups with a stoichiometric excess of an organomagnesium composition, with respect to the OH groups content, and then reacting the product with a tetravalent titanium compound. The thus-obtained catalyst is activated with a suitable activator, e.g., disclosed by Stevens et al, U.S. Pat. No. 3,787,384 or by Stroebel et al, U.S. Pat. No. 4,148,754. The preferred activator of Nowlin et al is triethylaluminum.

It is a primary object of the present invention to prepare a catalyst composition for the polymerization of alpha-olefins which yields polymerization products having a relatively narrow molecular weight distribution.

Additional objects of the present invention will become apparent to those skilled in the art from the following description.

SUMMARY OF THE INVENTION

An alpha-olefin polymerization catalyst composition is prepared in a process comprising reacting a transition metal compound with trimethylaluminum, used as the catalyst activator.

In one preferred embodiment, the catalyst composition is prepared in a process comprising contacting an organomagnesium composition with a solid, porous carrier and contacting the product of that step with a transition metal compound, as described by Nowlin et al, U.S. Pat. No. 4,481,301. The resulting precursor product is then contacted with trimethylaluminum.

In another preferred embodiment, the catalyst composition is prepared in a process comprising forming a precursor composition from a magnesium compound, a titanium compound and an electron donor compound and diluting the precursor composition with an inert carrier, as described by Karol et al, European Patent Application No. 84103441.6, filed Mar. 28, 1984, Publication No. 0 120 503, published on Oct. 3, 1984, the entire contents of which are incorporated herein by reference. The precursor is then activated, in accordance with the present invention, with trimethylaluminum.

The invention is also directed to an alpha-olefin polymerization process conducted in the presence of a catalyst composition of this invention and to the polymer products produced thereby.

BRIEF DESCRIPTION OF THE FIGURE

The FIGURE is a graphical representation of the effect of TMA content on productivity for the catalyst of Examples 5-9.

DETAILED DESCRIPTION OF THE INVENTION

We unexpectedly found that the use of trimethylaluminum (TMA) as the activator for the precursor composition instead of triethylaluminum (TEAL), commonly used heretofore as the preferred catalyst activator, produces improved catalyst compositions which, when used in alpha-olefin polymerization reactions, produce linear low density polyethylene polymer resins (LLDPE) and high density resins having substantially lower values of melt flow ratio (MFR) (calculated by dividing the value of high load melt index, HLMI, $I_{21}$, by the value of melt index, MI, $I_2$, for a given polymer) than similar resins produced with similar catalyst compositions synthesized with TEAL as the catalyst activator.

Additionally, the polymer resins produced with the novel catalyst composition of this invention have reduced hexane extractables, and films manufactured from such polymer resins have improved strength properties, as compared to resins and films prepared from resins made with catalyst compositions activated with TEAL.

The resins prepared with the catalyst of the invention may have higher settled bulk densities than the resins prepared with similar catalysts synthesized with TEAL or other prior art activators, and may have substantially improved higher alpha-olefins, e.g., 1-hexene, incorporation properties, as compared to similar catalyst compositions synthesized with triethylaluminum. The improvements of the present invention are unexpected, especially since other workers in this field have emphasized the use of TEAL as the preferred catalyst activator (e.g., see Nowlin et al, U.S. Pat. No. 4,481,301).

The term "hexane extractables" is used herein to define the amount of a polymer sample extracted by refluxing the sample in hexane in accordance with the FDA-approved procedure. As is known to those skilled in the art, the FDA requires that all polymer products having food contact contain less than 5.5% by weight of such hexane extractables.

The polymers prepared in the presence of the catalyst of this invention are linear low density polyethylene resins or high density polyethylene resins which are homopolymers of ethylene or copolymers of ethylene and higher alpha-olefins. They exhibit relatively low values of melt flow ratio, evidencing a relatively narrow molecular weight distribution, than similar polymers prepared in the presence of similar previously-known catalyst compositions prepared with TEAL as the activator, e.g., those disclosed by Karol et al, European Patent Application No. 84103441.6. Thus, the polymers prepared with the catalysts of this invention are especially suitable for the production of low density, high strength film resins, and low density injection molding resins.

The manner of combining the TMA catalyst activator with the catalyst precursor is not critical to the present invention, and the TMA may be combined with the precursor in any convenient, known manner. Thus, the TMA may be combined with the catalyst precursor either outside of the reactor vessel, prior to the polymerization reaction, or it can be introduced into the reactor vessel simultaneously or substantially simultaneously with the catalyst precursor.

The catalyst precursor (defined herein as the catalyst composition prior to the reaction thereof with the trimethylaluminum, TMA) is any one of the well known to those skilled in the art Ziegler catalyst precursors comprising a transition metal or a compound thereof, e.g., titanium tetrachloride. The catalyst precursor may be supported on an inert support, e.g., see Karol et al, U.S. Pat. No. 4,302,566 and Nowlin et al, U.S. Pat. No. 4,481,301, or unsupported, e.g., Yamaguchi et al, U.S. Pat. No. 3,989,881. Suitable catalyst precursor compositions are disclosed, for example, by Yamaguchi et al, U.S. Pat. No. 3,989,881; Nowlin et al, U.S. Pat. No. 4,481,301; Hagerty et al, U.S. Pat. No. 4,562,169; Goeke et al, U.S. Pat. No. 4,354,009; Karol et al, U.S. Pat. No. 4,302,566; Strobel et al, U.S. Pat. No. 4,148,754; and Ziegler, Deceased, et al, U.S. Pat. No. 4,063,009, the entire contents of all of which are incorporated herein by reference.

Catalyst compositions produced in accordance with the present invention are described below in terms of the manner in which they are synthesized.

Any one or a combination of any of the well known transition metal compounds can be used in preparing the catalyst precursor of this invention. Suitable transition metal compounds are compounds of Groups IVA, VA, or VIA, VIIA or VIII of the Periodic Chart of the Elements, published by the Fisher Scientific Company, Catalog No. 5-702-10, 1978, e.g., compounds of titanium (Ti), zirconium (Zr), vanadium (V), tantalum (Ta), chromium (Cr) and molybdenum (Mo), such as $TiCl_4$, $TiCl_3$, $VCl_4$, $VCl_3$, $VOCl_3$, $MoCl_5$, $ZrCl_5$ and chromiumacetylacetonate. Of these compounds, the compounds of titanium and vanadium are preferred, and the compounds of titanium are most preferred. The transition metal compound is reacted with TMA in any conventional manner in which the transition metal compounds of prior art were reacted with the activators used in prior art. For example, the transition metal compound can be dissolved in a suitable solvent, e.g., isopentane or hexane, and the resulting solution reacted with TMA, which may also be used as a solution in a suitable solvent, e.g., isopentane. It is preferable, however, to introduce the catalyst precursor into a reactor and introduce the TMA activator into the reactor simultaneously with the introduction of the catalyst precursor or after the introduction of the precursor is terminated.

In an alternative and preferred embodiment, the catalyst precursor composition is prepared by reacting an organometallic or a halide compound of Groups IA to IIIA with a transition metal compound. The Group IA to IIIA organometallic or halide compounds are also any compounds used in prior art in Ziegler-Natta catalyst synthesis. Suitable compounds are compounds of magnesium, e.g., Grignard reagents, magnesium dialkyls, and magnesium halides.

The thus-formed catalyst precursor is optionally contacted with at least one pre-reducing agent, e.g., tri-n-hexyl aluminum, or diethyl aluminum chloride, prior to activation with TMA. The amount of the pre-reducing agent may be adjusted as described by Karol et al, European Patent Application No. 84103441.6, to obtain a favorable balance of catalyst productivity and settled bulk density of the resin. The pre-reduced precursor is then activated either outside of the reactor vessel or inside the vessel with the trimethylaluminum catalyst activator.

The TMA activator is employed in an amount which is at least effective to promote the polymerization activity of the solid component of the catalyst of this invention. Preferably, the TMA activator is used in such amounts that the concentration thereof in the polymer product is about 15 to about 300 parts per million (ppm), preferably it is about 30 to about 150 ppm, and most preferably about 40 to about 80 ppm. In slurry polymerization processes, a portion of the TMA activator can be employed to pretreat the polymerization medium if desired.

The catalyst may be activated in situ by adding the activator and catalyst separately to the polymerization medium. It is also possible to combine the catalyst and activator before the introduction thereof into the polymerization medium, e.g., for up to about 2 hours prior to the introduction thereof into the polymerization medium at a temperature of from about $-40°$ to about $100°$ C.

A suitable activating amount of the activator may be used to promote the polymerization activity of the catalyst. The aforementioned proportions of the activator can also be expressed in terms of the number of moles of activator per gram atom of titanium in the catalyst composition, e.g., from about 6 to about 80, preferably about 8 to about 30 moles of activator per gram atom of titanium.

Alpha-olefins may be polymerized with the catalysts prepared according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 70° to about 105° C. The molecular weight control is evidenced by a measurable positive change in melt index ($I_2$) of the polymer when the molar ratio of hydrogen to ethylene in the reactor is increased.

We found that the average molecular weight of the polymer is also dependent on the amount of the TMA activator employed. Increasing the TMA concentration in the reactor gives small, positive changes in melt index.

The molecular weight distribution of the polymers prepared in the presence of the catalysts of the present invention, as expressed by the melt flow ratio (MFR) values, varies from about 24 to about 29 for LLDPE products having a density of about 0.914 to about 0.926 gms/cc, and an $I_2$ melt index of about 0.9 to about 4.0. As is known to those skilled in the art, such MFR values are indicative of a relatively narrow molecular weight distribution, thereby rendering the polymers especially suitable for low density film applications since the products exhibit less molecular orientation in high-speed film blowing processes, and therefore have greater film strength.

The polymers produced with the catalyst compositions of the present invention have about 20-30% lower hexane extractables than the polymers prepared with catalysts activated with triethylaluminum (TEAL) or triisobutylaluminum (TIBA), both of which were commonly used as catalyst activators in prior art. The physical properties of the films made from the resins polymerized with the catalysts of this invention are also better than those made from the resins polymerized with the TEAL- and TIBA-activated catalysts. For example, the films of the present invention exhibit about 20-30% improvement in dart drop and machine dimension (MD) tear properties than the films prepared with such previously-known catalysts. The films also exhibit about 30% to about 40% lower relaxation time and about 20% lower die swell characteristics than films prepared with the heretofore known catalyst compositions.

Dart drop is defined herein by A.S.T.M. D-1709, Method A; with a 38.1 mm dart, and a drop height of 0.66 meters.

Melt relaxation time is defined herein as the time for shear stress in a polymer melt at 190° C. to decay to 10% of its steady value after cessation of steady shear flow of 0.1 sec$^{-1}$.

Die swell is defined herein as the diameter of the extrudate divided by the diameter of the die using an extrusion plastometer, as described by A.S.T.M. D-1238.

The higher alpha-olefin incorporation properties of the catalysts of this invention are also improved as compared to TEAL- and TIBA-activated catalysts, as evidenced by the lower mole ratio of higher alpha-olefin/ethylene necessary to produce resins of a certain melt index and density.

The catalysts prepared according to the present invention are highly active, their productivity is at least about 1,000, and can be as much as about 10,000, grams of polymer per gram of catalyst precursor per 100 psi of ethylene partial pressure.

The polyethylene polymers prepared in accordance with the present invention may be homopolymers of ethylene or copolymers of ethylene with one or more $C_3$-$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred polymers are copolymers of ethylene and 1-hexene, and copolymers of ethylene and 1-butene.

The linear low density polyethylene polymers produced in accordance with the present invention preferably contain at least about 80 percent by weight of ethylene units.

A particularly desirable method for producing linear low density polyethylene polymers according to the present invention is in a fluid bed reactor. Such a reactor and means for operating the same is described by Levine et al, U.S. Pat. No. 4,011,382 and Karol et al, U.S. Pat. No. 4,302,566, the entire contents of both of which being incorporated herein by reference, and by Nowlin et al, U.S. Pat. No. 4,481,301.

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

Density: ASTM D-1505—A plaque is made and conditioned for one hour at 100° C. to approach equilibrium crystallinity. Measurement for density is then made in a density gradient column; reported as gms/cc.

Melt Index (MI), $I_2$: ASTM D-1238—Condition E—Measured at 190° C.—reported as grams per 10 minutes.

High Load Melt Index (HLMI), $I_{21}$: ASTM D-1238—Condition F—Measured at 10.5 times the weight used in the melt index test above.

Melt Flow Ratio (MFR)=$I_{21}/I_2$

Productivity: A sample of the resin product is ashed, and the weight % of ash is determined; since the ash is essentially composed of the catalyst, the productivity is thus the pounds of polymer produced per pound of total catalyst consumed. THe amount of Ti, Mg and Cl in the ash are determined by elemental analysis.

Settled Bulk Density: The resin is poured via 1" diameter funnel into a 100 mil graduated cylinder to 100 mil line without shaking the cylinder, and weighed by difference. The cylinder is then vibrated for 5-10 minutes until the resin level drops to a final, steady-state level. The settled bulk density is taken as the indicated cylinder volume at the settled level, divided by the measured resin weight.

n-hexane extractables: (FDA test used for polyethylene film intended for food contact applications). A 200 square inch sample of 1.5 mil gauge film is cut into strips measuring 1"×6" and weighed to the nearest 0.1 mg. The strips are placed in a vessel and extracted with 300 ml of n-hexane at 50°±1° C. for 2 hours. The extact is then decanted into tared culture dishes. After drying the extract in a vacuum dessicator the culture dish is weighed to the nearest 0.1 mg. The extractables, normalized with respect to the original sample weight, is then reported as the weight fraction of n-hexane extractables.

Machine Direction Tear, $MD_{TEAR}$(gm/mil): ASTM D-1922

EXAMPLE 1

Catalyst Precursor Synthesis

All procedures were carried out in clean, commercial scale equipment under purified nitrogen, or dry air. All solvents were pre-dried and nitrogen-purged. This catalyst precursor was prepared substantially according to the disclosure of Hagerty et al, U.S. Pat. No. 4,562,169.

Precursor Preparation

First Step:

348 kgs of Davison 955 silica was heated at 825° C. for about 4 hours in an atmosphere of dry air (Analysis: OH=0.53 mmoles/gm). The silica was then transferred into a 4000 liter mix vessel under a slow nitrogen purge. The mix vessel was equipped with a ribbon-type mechanical stirrer to provide mixing of the internal contents. Approximately 2700 liters of dry isopentane was added while stirring, and the resulting slurry was heated to 70° C. 160 kgs of a 2.28 molar solution of ethylmagnesium chloride (EtMgCl) in tetrahydrofuran (THF) was added through a spray nozzle over a 60 minute period while stirring. The slurry was mixed for an additional 60 minutes to complete reaction. Then the solvent was removed by distillation at 70° C., and the product was dried at 82° C. for about 55 hours with a slow nitrogen purge to yield a free-flowing powder. Analysis: Mg=2.54 wt.%, THF=4.55 wt.%.

Second Step:

The product from the first step was held in the mix vessel under a dry nitrogen atmosphere at 62° C., while stirring. 1770 liters of dry isopentane was fed to the mix vessel simultaneously with 300 kgs of $TiCl_4$ through a common feed line. The addition time was approximately 90 minutes. The mix vessel's internal temperature was then raised to 80° C. and held for 2 hours to complete reaction. The solids were allowed to settle, and the supernatant liquid was withdrawn through a dip-tube. The product was washed nine (9) times with 2000 l portions of isopentane to remove excess $TiCl_4$. The product was then dried for 8.5 hours with a slow nitrogen purge at 60° C. The resulting catalyst precursor product was analyzed as follows: Mg=2.23 wt.%; Ti=3.33 wt.%; Cl=1.20 wt.% THF=1.91 wt.%.

EXAMPLE 2

Preparation of LLDPE Product With TEAL-Activated Precursor of Example 1

The catalyst precursor composition of Example 1 was used to prepare a linear low density polyethylene product (LLDPE) in a fluid bed, pilot plant reactor operated substantially in the manner disclosed by Nowlin et al, U.S. Pat. No. 4,481,301. The reactor was 0.45 meters in diameter and it was capable of producing up to 25 kgs/hr of resin. A steady-state reaction was obtained by continuously feeding catalyst precursors, TEAL activator, and reactant gases (ethylene, 1-hexene and hydrogen) to the reactor while also continuously withdrawing polymer product from the reactor. The feed rate of ethylene was maintained at a constant 13.0 kgs/hr, and the feed rate of catalyst precursor was adjusted to achieve a substantially equal rate of polymer production. The feed rate of TEAL was 4.69 gms/hr, equivalent to a 361 ppm feed ratio of TEAL to ethylene. Reaction temperature was 88° C., superficial gas velocity was 0.45 meters/sec, and fluid bed residence time was approximately 5 hours. Other reaction conditions, including gas phase composition in the reactor, are given in Table 1.

Catalyst productivity was determined by dividing the polymer production rate by the catalyst feed rate. A value of 5270 grams of polymer per gram of catalyst precursor was thereby obtained (Table I). The polymer product was evaluated in a conventional manner, and the results are summarized in Table II.

EXAMPLE 3

Preparation of LLDPE Products with TMA-Activated Precursor of Example 1

LLDPE polymer was produced with the catalyst precursor of Example 1, using substantially the same reaction conditions as in Example 2, except that TMA was used as the activator in place of TEAL. The TMA feed ratio to ethylene was 156 ppm. Reaction conditions are summarized in Table I, and product properties are summarized in Table II.

TABLE I

| | | (Precursor of Example 1) | | | | |
|---|---|---|---|---|---|---|
| Ex. No. | Activator Type | Activator Feed Ratio (ppm) | $P_{C_2=}$ (psi) | Mole Ratio $1\text{-}C_6=/C_2=$ | $H_2/C_2=$ | Catalyst Productivity (gms polymer/gms catalyst precursor) |
| 2 | TEAL | 182 | 93 | 0.141 | 0.239 | 5270 |
| 3 | TMA | 187 | 95 | 0.115 | 0.229 | 4450 |

TABLE II

Resin Properties
(Precursor of Example 1)

| Ex. No. | Density (gm/cc) | $I_{21}$ (gms/10 min) | MFR | FDA Extract (wt. %) | Settled Bulk Density (lbs/ft$^3$) | MD Tear (gms/mil) |
|---|---|---|---|---|---|---|
| 2 | 0.9169 | 54.5 | 32.3 | 6.51 | 21.3 | 332 |
| 3 | 0.9152 | 48.8 | 32.5 | 7.37 | 24.3 | 324 |

Comparison of TEAL Versus TMA In Examples 2 and 3

The use of TMA activator in place of TEAL produced a catalyst composition with somewhat less productivity (grams of polymer per gram of catalyst precursor). The catalyst productivity in Example 3 was reduced by 16% in comparison with Example 2 (Table I) at an approximately constant level of ethylene partial pressure ($PC_2=$).

The comonomer incorporation was significantly improved with TMA, as indicated by an 18% lower gas phase molar ratio of 1-hexene to ethylene (1-$C_6=/C_2=$) that was required to produce a product density in the 0.915 to 0.917 gms/cc density range (Tables I and II).

FDA extractables were higher with TMA (7.37 wt. %) than with TEAL (6.15%). This difference is believed to be the result of the lower polymer density obtained in Example 3 (0.9152 gms/cc) in comparison with Example 2 (0.9169 gms/cc). Lower density LLDPE polymers inherently exhibity higher levels of extractable material. The apparent difference in FDA extractables between the polymers of Examples 2 and 3 is therefore not believed to be a fundamental difference between TMA and TEAL activators.

Polymer settled bulk density was approximately 14% higher with the TMA activator-containing catalyst in comparison with the TEAL activator-containing catalyst (Table II).

EXAMPLE 4

Catalyst Precursor Synthesis

Another catalyst precursor was synthesized according to the teachings of Karol et al, European Patent Application No. 84103441.6, filed on Mar. 28, 1984, Publication No. 0 120 503, published on Oct. 3, 1984. This catalyst precursor is substantially equivalent to that of Karol et al, as disclosed in the aforementioned Published European Patent Application. It is also substantially equivalent to the precursors prepared by the following representative procedure.

(a) Impregnation of Support with Precursor

In a 12 liter flask equipped with a mechanical stirrer were placed 41.8 g (0.439 mol) of anhydrous $MgCl_2$ and 2.5 liters of tetrahydrofuran (THF). To this mixture, 29.0 (0.146 mol) of $TiCl_3.0.33AlCl_3$ were added dropwise over a ¼ hour period. The mixture was then heated at 60° C. for another ½ hour in order to completely dissolve the material.

Five hundred grams (500 g) of silica were dehydrated by heating at a temperature of 600° C. and slurried in 3 liters of isopentane. The slurry was stirred while 186 ml of a 20 percent by weight solution of triethylaluminum in hexane was added thereto over a ¼ hour period. The resulting mixture was then dried under a nitrogen purge at 60° C. over a period of about 4 hours to provide a dry, free-flowing powder containing 5.5 percent by weight of the aluminum alkyl.

The treated silica was then added to the solution prepared as above. The resulting slurry was stirred for ¼ hour and then dried under a nitrogen purge at 60° C. over a period of about 4 hours to provide a dry, impregnated, free-flowing powder.

(b) Preparation of Partially Activated Precursor (i) The silica-impregnated precursor composition prepared in accordance with Example 4(a) was slurried in 3 liters of anhydrous isopentane and stirred while a 20 percent by weight solution of diethylaluminum chloride in anhydrous hexane was added thereto over a ¼ hour period. The diethylaluminum chloride (DEAC) solution was employed in an amount sufficient to provide 0.4 mols of this compound per mol of tetrahydrofuran (THF) in the precursor. After addition of the diethylaluminum chloride was completed, stirring was continued for an additional ¼ to ½ hour while a 20 percent by weight solution of tri-n-hexylaluminum (TNHAL) in anhydrous hexane was added in an amount sufficient to provide 0.6 mols of this compound per mol of tetrahydrofuran in the precursor. The mixture was then dried under a nitrogen purge at a temperature of 65°±10° C. over a period of about 4 hours to provide a dry, free-flowing powder. This material was stored under dry nitrogen until it was needed.

Two alternative procedures (ii) and (iii) for partially activating the precursor may be employed. (ii) The silica-impregnated precursor composition prepared in accordance with Example 4(a) was partially activated with diethylaluminum chloride and tri-n-hexylaluminum employing the same procedure as in 4(b)(i) except that the tri-n-hexylaluminum was employed in an amount sufficient to provide 0.4 mols of this compound per mol of tetrahydrofuran in the precursor.

(iii) The silica-impregnated precursor composition prepared in accordance with Example 4(a) was partially activated with diethylaluminum chloride and tri-n-hexylaluminum employing the same procedure as in 2(a) except that each compound was employed in an amount sufficient to provide 0.3 mols of such compound per mol of tetrahydrofuran in the precursor.

EXAMPLE 5

Preparation of LLDPE Product With TEAL-Activated Precursor of Example 4

The partially activated catalyst precursor composition of Example 4, with the molar ratios of DEAC/THF=0.36 and TNHAL/THF=0.25, was used to prepare LLDPE product in a fluid bed, pilot plant reactor. Reaction conditions were substantially equivalent to those of Examples 2 and 3, except that the reaction temperature was 86° C. Other reaction conditions are summarized in Table III. The product properties were determined in a conventional manner and are summarized in Table IV.

EXAMPLES 6–10

Preparation of LLDPE Products with TMA-Activated Precursor of Example 4

The partially activated precursor composition of Example 4, with the molar ratios of DEAC/THF=0.36 and TNHAL/THF=0.25, was used to prepare LLDPE product in a fluid bed, pilot plant reactor. Reaction conditions were substantially equivalent to those of Example 5, except that a TMA activator was used in place of TEAL, and adjustments were made to the activator feed ratio and ethylene partial pressure ($P_{C_2=}$) to determine the separate effects of these variables. Reaction conditions are summarized in Table III, and the product properties are summarized in Table IV.

The hydrogen to ethylene molar ratio in the reactor ($H_2/C_2=$) was adjusted as required to obtain a high load melt index ($I_{21}$) of about 30 gms/10 min. Different levels of $H_2/C_2=$ were required depending on the TMA activator feed ratio (Table III).

TABLE III

Reaction Conditions
(Precursor of Example 4)

| Ex. No. | Activator Type | Activator/$C_2=$ Feed (ppm) | $P_{C_2=}$ (psi) | $1\text{-}C_6=/C_2=$ (moles/mole) | $H_2/C_2=$ (moles/mole) | Productivity (gms/gm) |
|---|---|---|---|---|---|---|
| 5 | TEAL | 361 | 89 | 0.149 | 0.129 | 4190 |
| 6 | TMA | 156 | 93 | 0.139 | 0.177 | 3320 |
| 7 | TMA | 71 | 86 | 0.148 | 0.170 | 4000 |
| 8 | TMA | 74 | 90 | 0.149 | 0.215 | 3640 |
| 9 | TMA | 240 | 94 | 0.142 | 0.162 | 2580 |
| 10 | TMA | 245 | 129 | 0.143 | 0.161 | 4510 |

TABLE IV

Resin Properties
(Precursor of Example 4)

| Ex. No. | Density (gm/cc) | $I_{21}$ (gms/10 min) | MFR | FDA Extract (wt. %) | Settled Bulk Density (lbs/ft$^3$) | MD Tear (gms/mil) |
|---|---|---|---|---|---|---|
| 5 | 0.9160 | 31.0 | 32.3 | 6.05 | 25.5 | 266 |
| 6 | 0.9166 | 31.6 | 28.5 | 4.54 | 25.2 | 310 |
| 7 | 0.9159 | 22.4 | 28.7 | 3.69 | 25.4 | 345 |
| 8 | 0.9165 | 34.9 | 28.6 | 3.86 | 25.9 | 382 |
| 9 | 0.9159 | 26.6 | 27.1 | 4.02 | 25.9 | 321 |
| 10 | 0.9169 | 32.2 | 28.3 | 4.37 | 25.4 | 356 |

Discussion Of Examples 6-10

The various levels of ethylene partial pressure and TMA activator feed ratios used in Examples 6-10 had no substantial effect on product properties. As indicated in Table IV, the polymer MFR, FDA extractables, settled bulk density, and MD tear strength were essentially the same in Examples 6 through 10.

However, the productivity of the TMA-activated precursor was found to be strongly dependent on the ethylene partial pressure and activator feed ratio. The ethylene partial pressure effect is illustrated by comparing Examples 9 and 10 in Table III: the productivity at 129 psi ethylene partial pressure was approximately 75% higher than at 94 psi. This effect is typical for Ziegler catalysts, including those disclosed by Nowlin et al, U.S. Pat. No. 4,481,301.

The effect on productivity of various activator feed ratios is illustrated in FIG. 1, which is a graphical representation of the data of Examples 6-9. The highest level of productivity are attained with relatively low activator feed ratios. A similar effect is known to exist with certain Ziegler catalyst compositions activated with TEAL, such as those of Example 1, although it is not present with the catalyst composition disclosed by Karol et al in the aforementioned European Patent Application (i.e., activated with TEAL). In the case of the Karol et al catalyst, the productivity is not sensitive to the TEAL feed ratio over a broad range.

Comparison Of TEAL Versus TMA In Examples 5-10

The catalyst composition of the present invention produced polymer with lower melt flow ratio (MFR), lower FDA extractables, and higher MD tear strength in comparison with the prior art composition of Karol et al. However, unlike the previous Examples 2 and 3, there were no differences noted in settled bulk density or in comonomer incorporation (e.g., $1\text{-}C_6=/C_2=$ ratio in the reactor required to attain a density of 0.917 gms/cc).

The melt flow ratio in Table IV was reduced from 32.3 (Example 5 with TEAL) to an average of 28.2 (Examples 6-10 with TMA). FDA extractables were reduced by an average of 32%, and MD tear strength was increased by an average of 29%, in the same examples.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. In a process for preparing an alpha-olefin polymerization catalyst composition comprising a transition metal compound, a magnesium compound and a metal alkyl, the improvement comprising using trimethylaluminum as the metal alkyl.

2. A process of claim 1 wherein the magnesium compound is an organomagnesium composition.

3. A process of claim 2 wherein the catalyst composition is prepared by:
   (A) contacting a solid, porous carrier with the organomagnesium composition;
   (B) contacting the product of step (A) with the transition metal compound; and
   (C) contacting the product of step (B) with the trimethylaluminum.

4. A process of claim 3 wherein the catalyst composition is prepared in a process comprising the steps of:
   (i) contacting a solid, porous carrier having reactive OH groups with a liquid containing at least one organomagnesium composition having the empirical formula:

where R and R' are the same or different and they are $C_1$-$C_{12}$ hydrocarbyl groups, provided that R' may also be a halogen, and n is 0, 1 or 2, the number of moles of said organomagnesium composition being in excess of the number of moles of said OH groups on said carrier;

(ii) evaporating said liquid from step (i) to produce a supported magnesium composition in the form of a dry, free-flowing powder; and (iii) reacting said powder of step (ii) with at least one transition metal compound in a liquid medium, the number of moles of said transition metal compound being in excess of the number of moles of the OH groups on said carrier prior to the reaction of the carrier with said organomagnesium composition in step (i), said transition metal compound being soluble in said liquid medium, and said supported magnesium composition being substantially insoluble in said liquid medium.

5. A process of claim 4 wherein the transition metal compound is a titanium compound.

6. A process of claim 5 wherein the titanium compound is a tetravalent titanium compound.

7. A process of claim 6 wherein the catalyst composition comprises such an amount of the trimethylaluminum that the polymer prepared with the catalyst composition comprises about 15 to about 300 parts per million of the trimethylaluminum.

8. A process of claim 7 wherein n is 1.

9. A process of claim 8 wherein said step (i) comprises:

(a) slurrying the carrier in a non-Lewis base liquid; and (b) adding to the slurry resulting from step (a) the organomagnesium composition in the form of an ether solution thereof.

10. A process of claim 9 wherein the ether is tetrahydrofuran.

11. A process of claim 10 wherein the porous, solid carrier is silica, alumina or combinations thereof.

12. A process of claim 11 wherein the porous, solid carrier is silica.

13. A process of claim 12 wherein the tetravalent titanium compound is $TiCl_4$.

14. A process of claim 13 wherein, in step (i), the ratio of the number of moles of said organomagnesium composition to the number of moles of the OH groups on said silica is from about 1.1 to about 3.5.

15. A process of claim 14 wherein in step (i), the ratio of the number of moles of said organomagnesium composition to the number of moles of the OH groups on said silica is about 1.5 to 3.5.

16. A process of claim 15 wherein said liquid medium is an alkane, cycloalkane, aromatics or halogenated aromatics.

17. A process of claim 16 wherein said liquid medium is hexane.

18. A process of claim 17 wherein, prior to contacting the silica in step (i), it is heated at a temperature of about 750° C. for at least four hours.

19. A process of claim 18 wherein the organomagnesium composition is ethylmagnesium chloride.

20. In an alpha-olefin polymerization catalyst composition comprising a transition metal compound, a magnesium compound and a metal alkyl, the improvement comprising using trimethylaluminum as the metal alkyl.

21. A catalyst composition of claim 20 wherein the magnesium compound is an organomagnesium composition.

22. A catalyst composition of claim 21 wherein it is prepared by:

(A) contacting a solid, porous carrier with the organomagnesium composition;

(B) contacting the product of step (A) with the transition metal compound; and (C) contacting the product of step (B) with the trimethylaluminum.

23. A catalyst composition of claim 22 wherein it is prepared in a process comprising the steps of (i) contacting a solid, porous carrier having reactive OH groups with a liquid containing at least one organomagnesium composition having the empirical formula:

$$R_nMgR'_{(2-n)}$$

where R and R' are the same or different and they are $C_1$-$C_{12}$ hydrocarbyl groups, provided that R' may also be a halogen, and n is 0, 1 or 2, the number of moles of said organomagnesium composition being in excess of the number of moles of said OH groups on said carrier;

(ii) evaporating said liquid from step (i) to produce a supported magnesium composition in the form of a dry, free-flowing powder; and (iii) reacting said powder of step (ii) with at least one transition metal compound in a liquid medium, the number of moles of said transition metal compound being in excess of the number of moles of the OH groups on said carrier prior to the reaction of the carrier with said organomagnesium composition in step (i), said transition metal compound being soluble in said liquid medium, and said supported magnesium composition being substantially insoluble in said liquid medium.

24. A catalyst composition of claim 23 wherein the transition metal compound is a titanium compound.

25. A catalyst composition of claim 24 wherein the titanium compound is a tetravalent titanium compound.

26. A catalyst composition of claim 25 which comprises such an amount of the trimethylaluminum that the polymer prepared with the catalyst composition comprises about 15 to about 300 parts per million of the trimethylaluminum.

27. A catalyst composition of claim 26 wherein n is 1.

28. A catalyst composition of claim 27 wherein said step (i) comprises:

(a) slurrying the carrier in a non-Lewis base liquid; and (b) adding to the slurry resulting from step (a) the organomagnesium composition in the form of an ether solution thereof.

29. A catalyst composition of claim 28 wherein the ether is tetrahydrofuran.

30. A catalyst composition of claim 29 wherein the porous, solid carrier is silica, alumina or combinations thereof.

31. A catalyst composition of claim 30 wherein the porous, solid carrier is silica.

32. A catalyst composition of claim 31 wherein the tetravalent titanium compound is $TiCl_4$.

33. A catalyst composition of claim 32 wherein, in step (i), the ratio of the number of moles of said organomagnesium composition to the number of moles of the OH groups on said silica is from about 1.1 to about 3.5.

34. A catalyst composition of claim 33 wherein, in step (i), the ratio of the number of moles of said organomagnesium composition to the number of moles of the OH groups on said silica is about 1.5 to 3.5.

35. A catalyst composition of claim 34 wherein said liquid medium is an alkane, cycloalkane, aromatics or halogenated aromatics.

36. A catalyst composition of claim 35 wherein said liquid medium is hexane.

37. A catalyst composition of claim 36 wherein, prior to contacting the silica in step (i), it is heated at a temperature of about 750° C. for at least four hours.

38. A catalyst composition of claim 37 wherein the organomagnesium composition is ethylmagnesium chloride.

39. A process of claim 1 wherein the catalyst composition is prepared by
(A) contacting a solution of a magnesium compound in a liquid with a titanium compound;
(B) contacting the resulting solution of step (A) with a solid, inert porous carrier to form a catalyst precursor; and
(C) contacting the precursor with the trimethylaluminum.

40. A process of claim 39 wherein the magnesium compound has the empirical formula $$MgX_2$$

wherein X is Cl, Br, I or mixtures thereof.

41. A process of claim 40 wherein the magnesium compound is $MgCl_2$.

42. A process of claim 41 wherein said liquid is at least one Lewis base.

43. A process of claim 42 wherein the Lewis base is selected from the group consisting of aliphatic carboxylic acids, aromatic carboxylic acids, aliphatic ethers, cyclic ethers and aliphatic ketones.

44. A process of claim 43 wherein the Lewis base is selected from the group consisting of aliphatic ethers and cyclic ethers.

45. A process of claim 44 wherein the Lewis base is tetrahydrofuran.

46. A process of claim 45 wherein the titanium compound is $TiCl_3$, $TiCl_4$, $Ti(OCH_3)Cl_3$, $Ti(OC_6H_5)Cl_3$, $Ti(OCOCH_3)Cl_3$ or $Ti(OCOC_6H_5)Cl_3$.

47. A process of claim 46 wherein the titanium compound is $TiCl_3$.

48. A catalyst composition of claim 20 wherein it is prepared by
(A) contacting a solution of a magnesium compound in a liquid with a titanium compound;
(B) contacting the resulting solution of step (A) with a solid, inert porous carrier to form a catalyst precursor; and,
(C) contacting the precursor with the trimethylaluminum.

49. A catalyst composition of claim 48 wherein the magnesium compound has the empirical formula $$MgX_2$$

wherein X is Cl, Br, I or mixtures thereof.

50. A catalyst composition of claim 49 wherein the magnesium compound is $MgCl_2$.

51. A catalyst composition of claim 50 wherein the liquid is at least one Lewis base.

52. A catalyst composition of claim 51 wherein the Lewis base is selected from the group consisting of aliphatic carboxylic acids, aromatic carboxylic acids, aliphatic ethers, cyclic ethers and aliphatic ketones.

53. A catalyst composition of claim 52 wherein the Lewis base is selected from the group consisting of aliphatic ethers and cyclic ethers.

54. A catalyst composition of claim 53 wherein the Lewis base is tetrahydrofuran.

55. A catalyst composition of claim 54 wherein the titanium compound is $TiCl_3$, $TiCl_4$, $Ti(OCH_3)Cl_3$, $Ti(OC_6H_5)Cl_3$, $Ti(OCOCH_3)Cl_3$ or $Ti(OCOC_6H_5)Cl_3$.

56. A catalyst composition of claim 55 wherein the titanium compound is $TiCl_3$.

* * * * *